(12) United States Patent  
Schafer et al.

(10) Patent No.: US 8,127,789 B2
(45) Date of Patent: Mar. 6, 2012

(54) FLUID RETAINING APPARATUS WITH BALL VALVE

(75) Inventors: Christopher E. Schafer, Adair, IA (US); Rodney M. Ramsey, Earlham, IA (US)

(73) Assignee: ARK Therapeutic Services, Inc., Lugoff, SC (US)

( * ) Notice: Subject to any disclaimer, the term of this patent is extended or adjusted under 35 U.S.C. 154(b) by 2224 days.

(21) Appl. No.: 10/697,376

(22) Filed: Oct. 30, 2003

(65) Prior Publication Data

US 2005/0092373 A1  May 5, 2005

(51) Int. Cl.
*F16K 21/04* (2006.01)
(52) U.S. Cl. .................... 137/533.11; 239/24
(58) Field of Classification Search ............. 137/533.11; 239/24, 29, 26
See application file for complete search history.

(56) References Cited

U.S. PATENT DOCUMENTS

| | | | | |
|---|---|---|---|---|
| 185,694 A * | 12/1876 | Newton | ........................ | 222/520 |
| 334,059 A * | 1/1886 | Tatum | ...................... | 137/533.11 |
| 342,478 A * | 5/1886 | Tatum | ...................... | 137/533.11 |
| 899,462 A * | 9/1908 | Nelson et al. | .................... | 137/43 |
| 1,813,285 A * | 7/1931 | Galetschky | ...................... | 239/33 |
| 1,906,312 A * | 5/1933 | Burt | .............................. | 166/328 |
| 2,692,751 A * | 10/1954 | Felver | .......................... | 251/342 |
| 2,855,127 A * | 10/1958 | Lerner et al. | .................... | 222/207 |
| 3,438,527 A * | 4/1969 | Gamblin, Jr. | ................. | 215/388 |
| 3,773,256 A * | 11/1973 | Wright | ................. | 239/1 |
| 4,070,237 A * | 1/1978 | Woodward | .................... | 162/217 |
| 4,142,645 A * | 3/1979 | Walton | .......................... | 215/260 |
| 4,196,747 A | 4/1980 | Quigley | | |
| 4,699,318 A | 10/1987 | Donatello | | |
| 4,945,947 A * | 8/1990 | Westra et al. | ............. | 137/519.5 |
| 5,010,925 A | 4/1991 | Atkinson et al. | | |
| 5,054,631 A | 10/1991 | Robbins | | |
| 5,060,833 A | 10/1991 | Edison | | |
| 5,085,349 A | 2/1992 | Fawcett | | |
| 5,234,117 A | 8/1993 | Garvin | | |
| 5,265,769 A | 11/1993 | Wilson | | |
| 5,601,207 A | 2/1997 | Paczonay | | |
| 6,032,831 A | 3/2000 | Gardner | | |
| 6,273,128 B1 * | 8/2001 | Paczonay | ................... | 137/512.3 |
| 6,279,772 B1 | 8/2001 | Bowman | | |

* cited by examiner

*Primary Examiner* — Craig Schneider
*Assistant Examiner* — Craig J Price
(74) *Attorney, Agent, or Firm* — G. Brian Pingel

(57) ABSTRACT

An apparatus that can be inserted into the bottom end of liquid delivery tube for retaining fluid in the tube to aid in drinking, utilizing a ball valve that for the most part only allows unidirectional flow of fluid through the valve and into the tube to prevent the level of fluid in the tube from significantly dropping and also creates a fluid free space at the end of the tube to prevent spillage.

1 Claim, 3 Drawing Sheets

FLUID RETAINING APPARATUS WITH BALL VALVE

BACKGROUND OF THE INVENTION

1. Field of the Invention

The present invention relates in general to devices for drinking fluid from a container, and more specifically to valves that ease the effort involved in drinking through a liquid delivery tube by retention of fluid in the tube. The invention further relates to the use of flow restriction to enable users to drink with less risk of fluid entering their lungs.

2. Description of the Prior Art

A variety of devices are known in the prior art to facilitate the drinking of fluid from a container. Many of these prior art devices are simply for the purpose of convenience or to provide fluid to a user while involved in some athletic activity such as biking. Inventors designed other prior art devices to be used by persons who are physically disabled in one fashion or another so that drinking from a liquid delivery tube such as a straw is highly difficult.

The human body requires the ingestion of fluids in order to maintain functions critical to life and health. Typically, replenishing body fluid is facilitated through the drinking of water or other fluids and is a natural intuitive process requiring little effort or thought. However, this is not the case for persons suffering from physical or mental ailments or for those who are particularly frail so that their swallowing function is diminished to the extent that fluid can more easily enter their lungs.

Drinking through a straw provides convenience and improves self-sufficiency for some, while others lack the level of dexterity necessary to perform and maintain a vacuum on the drinking end of the straw, especially between sips. Moreover, due to the containment of air inside the straw, a user will ingest air while drinking, thereby promoting possible discomfort, especially for a user that is unable to belch.

U.S. Pat. No. 4,196,747 discloses a check valve device that helps to overcome the difficulty of drinking through a straw. Although such patent discloses a device that eases the burden of having to void a straw or a drinking tube of air and maintain suction between drinks, the structure disclosed in the '747 patent suffers from several disadvantages. One of the major problems of the check valve disclosed in the '747 patent is that it is not compatible to be used with a standard drinking straw. Another disadvantage of the disclosed check valve is that it is relatively complex in structure. Yet another disadvantage is that the configuration includes no provision to prevent the apparatus from siphoning or drooling fluid on to the user. It also appears that it would be necessary for users to employ one of their hands to properly orient the drinking tube for use.

U.S. Pat. No. 5,265,769 discloses another type of drinking apparatus that has a one-way valve. The apparatus includes a bottle with a tube accessible by the mouth of a user and a one-way valve placed in the flow stream of the tube to prevent fluid from flowing back into the bottle. Again, this device appears to be helpful in assisting the drinking action of a user, but such device suffers from many of the same disadvantages as those discussed above.

U.S. Pat. Nos. 4,699,318 and 5,060,833 also disclose the use of one-way check valves near the outer end of a drinking tube. However, neither of the inventions of these patents is directed to be used by persons that are physically challenged. Instead, the '318 patent discloses a device for use by more than one person at a time, and the device of the '833 patent is specifically disclosed as being used in connection with bicyclists.

U.S. Pat. No. 5,234,117 discloses a straw adapter for a baby bottle that includes a drinking end that is curved and flattened and a straight end that extends to the bottom of a baby bottle. The disclosure of the '117 patent indicates that a unidirectional valve may be used in the adapter to make it easier for a baby to drink from the bottle with the invention.

Another drinking device with a flattened drinking end is disclosed in U.S. Pat. No. 5,054,631. The invention of such patent includes a one piece container that has a body portion and a drinking straw integrally attached to the body portion and in fluid communication with the liquid within the body portion. The terminal end of the straw includes a mouthpiece with a pair of lips that separate when suction is applied to the mouthpiece, but close when pressure is applied. A disadvantage of this configuration is that it requires a user to use their mouth to interact with the valve.

Another type of resilient valve device disclosed in the art is shown in U.S. Pat. No. 5,085,349 and involves a valve in the form of an elongated body member. The valve has a uniquely formed interior with an inner chamber wall that slopes in opposition to the outer wall to cause the valve to open when the valve body is deformed by the application of pressure by a user on the valve. U.S. Pat. No. 6,279,772 B1 discloses a flexible member with a slit that remains closed until the user deforms the flexible member. The disadvantage with these configurations is that they require the user to apply pressure onto the valve while maintaining suction.

Yet another prior art device is disclosed in U.S. Pat. No. 5,601,207 covering a bite valve for delivering liquid to the mouth of a user. The valve of this patent is somewhat unique in that it includes a plurality of spaced apart slits that allow liquid to flow through and out of the valve. This configuration shares the same disadvantage as mentioned above.

U.S. Pat. No. 5,010,925 discloses a valve assembly that is formed with a valve housing for enclosing a one-way flow valve. The valve assembly disclosed in this patent is relatively complex in structure and would appear to be difficult to manufacture.

In U.S. Pat. No. 6,032,831 a personal hydration system with an improved mouthpiece is disclosed and includes a normally closed slit that is opened when a user deforms the mouthpiece. Again, the mouthpiece of this invention has a relatively complex internal structure that is necessary for its operation and requires the user to maintain pressure to open the valve.

U.S. patent application Ser. No. 10/028,092 discloses a valve that is designed to be employed on the upper end of a straw or drinking tube and has a flexible outlet end that opens when a user applies suction. The disadvantage of this configuration is that the valve can, under certain circumstances, be removed from the straw by the user and it will then pose a danger of being swallowed if it enters the user's mouth.

The present invention is designed to make drinking from a straw easier and safer for people who have diminished physical and mental capacity and is formed with a relatively simple design that can be readily manufactured.

SUMMARY OF THE INVENTION

The present invention provides a fluid retaining apparatus with a ball valve for retaining fluid in a drinking tube, such as a straw. The ball valve includes a valve chamber with a valve seat at the inlet end thereof and a ball that can move between the ends of the valve chamber. The inlet valve seat is shaped such that when fluid is not being drawn through the drinking tube, the ball will sit in the inlet valve seat and prevent fluid from flowing out of the tube back through the inlet of the valve chamber. Ribs extending inwardly at the outlet end of the valve chamber prevent the ball from closing the outlet end of the valve chamber and blocking fluid movement. Extending from the outlet end of the valve chamber is an upper tapered tubular portion that allows the apparatus to be placed into a tube, such as a drinking straw and also provides for a restricted fluid flow therethrough for the safety of a user and allows adjustment of the fluid flow restriction.

It is therefore an object of the invention to provide a valve that can be inserted into a liquid delivery tube to prevent significant fluid back flow through the tube and thereby requiring less effort to resume fluid movement back up the tube.

It is also an object of this invention to lower the amount of fluid at the top or end of a tube so that fluid is not spilled from the tube when the tube is jostled.

It is also an object of this invention to restrict the flow of fluid through the valve chamber to provide a steady flow of fluid and prevent sucked fluid from traveling at a high velocity to the back of a drinker's mouth which could result in aspirating fluid into the lungs.

It is also an object of this invention to allow flow restriction to be adjusted to accommodate users with varying amounts of suction capability and fluids of varying thickness.

The foregoing and other advantages of the present invention will appear from the following description. In the description, reference is made to the accompanying drawings, which form a part hereof, and which are shown by illustration and not of limitation a specific form in which the invention may be embodied. Such embodiment does not represent the full scope of the invention, but rather the invention may be employed in a variety of other embodiments and reference should be made to the claims herein for interpreting the breadth of the invention.

BRIEF DESCRIPTION OF THE DRAWINGS

FIG. 2a is a further enlarged cross section view of the circled portion of FIG. 2.

DETAILED DESCRIPTION OF THE PREFERRED EMBODIMENT

Figure 1:
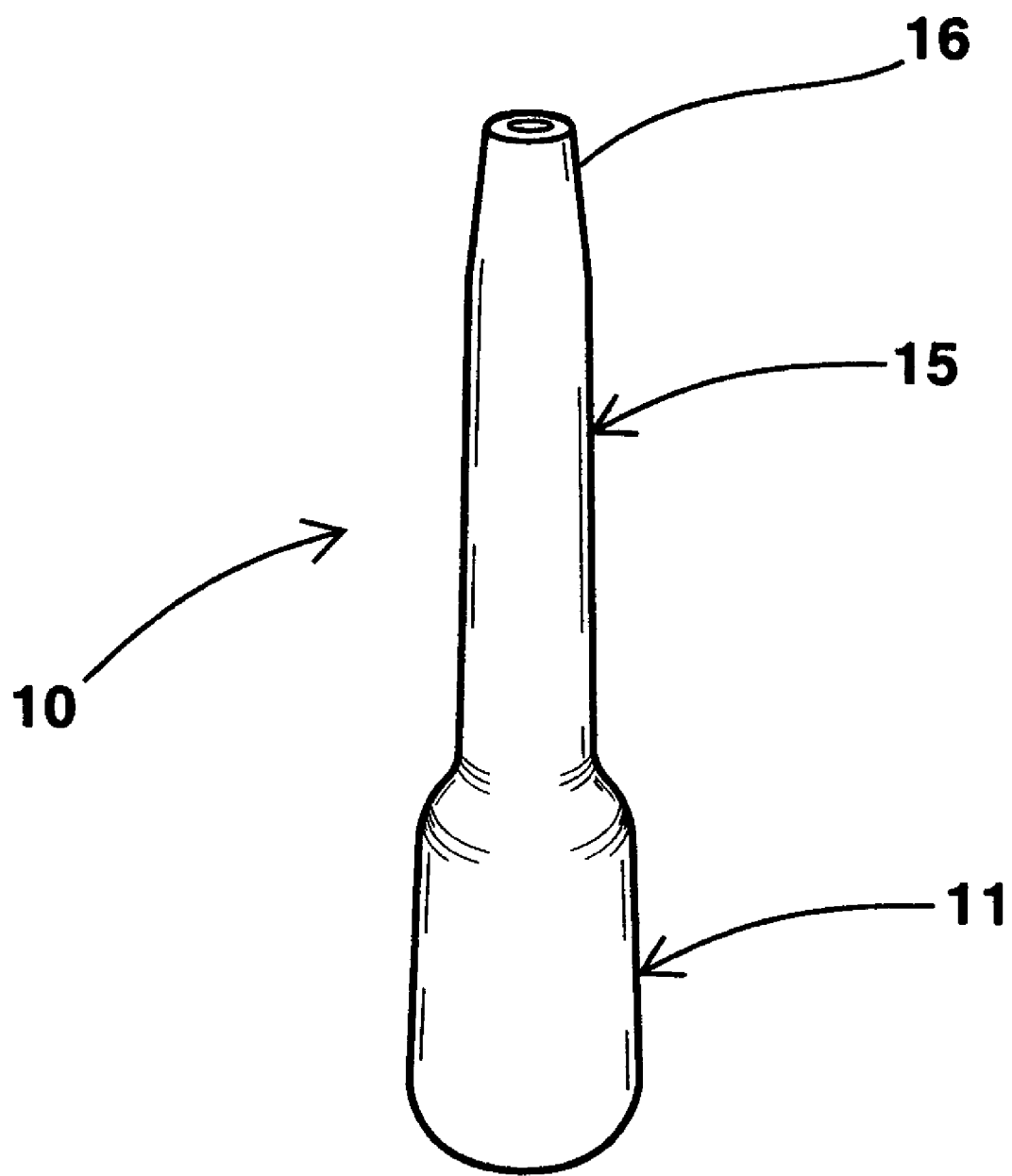
FIG. 1 is an enlarged side view in elevation of the preferred embodiment of a fluid retaining apparatus that forms the present invention.

With reference to the drawings, a preferred embodiment of the fluid retaining apparatus of the present invention is disclosed at 10 in FIG. 1. The apparatus 10 is formed from one piece of resilient plastic, such as low density polyethylene that is designed to be attached to the bottom end of a drinking tube, such as a straw, to retain fluid at all times in the tube during the drinking process by a user.

Figure 2:
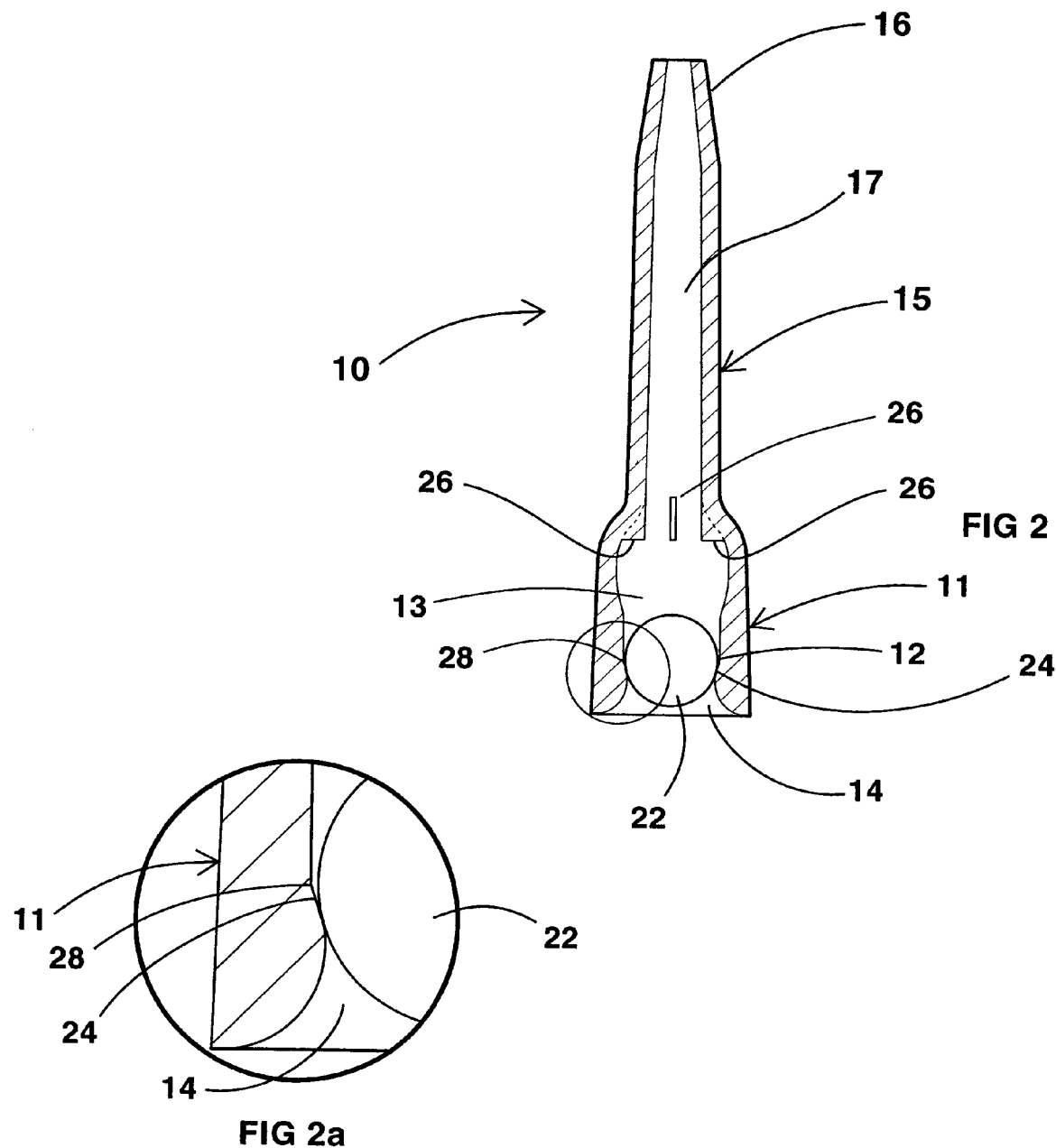
FIG. 2 is an enlarged cross section view taken longitudinally through the embodiment of FIG. 1 to show a ball valve with a valve chamber and a tubular upper portion above the valve.

Referring now to FIG. 2, the apparatus 10 includes a hollow lower portion 11 having an interior ball valve 12 with a valve chamber 13 and an inlet end 14 to allow fluid to enter the valve chamber 13. The apparatus 10 also has a hollow upper portion 15 with an outlet end 16 to allow fluid to exit the apparatus 10 and a passageway 17 that leads to the outlet end 16.

As shown best in FIG. 2, the upper portion 15 and the passageway 17 are tapered along their lengths first at a gradual taper and then at an accelerated taper at their outer ends for dual purposes that will now be described. Preferably, the upper portion 15 of the apparatus 10 begins directly above the ball valve 12 and is about 1.25" in length. The diameter of the upper portion 15 is tapered with its outside diameter directly above the valve chamber 13 at about 0.260". At a distance of about 1.00" above the valve chamber 13 the outside diameter is about 0.200" and the diameter of the passageway 17 is similarly reduced.

Figure 3:
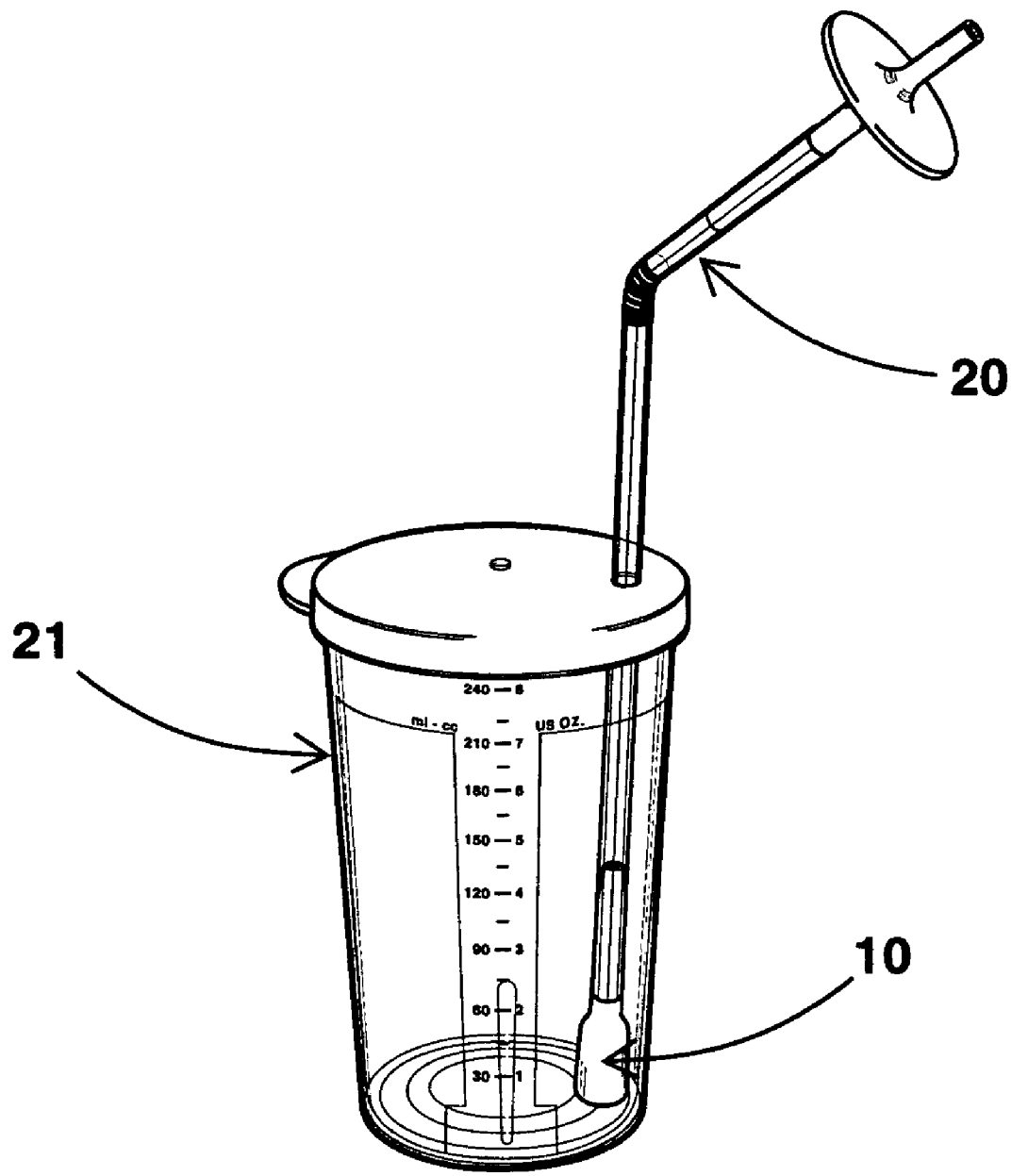
FIG. 3 is a side perspective view of the embodiment of FIG. 1 together with a straw in which the apparatus is inserted and a liquid container in which the apparatus and straw sit.

The apparatus 10 is attached to a liquid delivery tube, "straw" 20, as shown in FIG. 3 in association with a drinking vessel 21 by inserting the outlet end 16 inside of the straw 20. The accelerated taper at the last 0.250" of the upper portion 15 allows the user or caregiver to increase the flow of fluid through the apparatus 10 by trimming the outlet end 16 of the upper portion 15. The gradual taper of the upper portion 15 allows for the use of the apparatus 10 with liquid delivery tubs such as the straw 20 having varying inside diameters. It is highly desirable to place the apparatus 10 in the lower end of the straw 20 to prevent a user from removing it from the straw 20 during the drinking process.

The accelerated taper of the outlet end 16 provides for fluid flow restriction which prevents fluid from propelling to the back of the mouth of a user drinking from the straw 20. Such restriction improves a user's ability to swallow without aspirating fluid into their lungs, and enables a user with reduced cognizance to obtain a more consistent quantity of fluid with each sip. As mentioned above, the accelerated taper of the outlet end 16 can be reduced by trimming such end with a pair of scissors to increase the inside diameter of the outlet end 16 to accommodate thicker fluids and assist users unable to generate sufficient suction to draw fluid through a more restricted outlet end.

As indicated in FIG. 2, the valve chamber 13 contains a ball 22 that is reciprocally movable longitudinally with the flow of fluid between a valve seat 24 located at the valve chamber inlet end 14 and a plurality of circumferentially spaced apart interior ribs 26 integrally molded beginning at the upper inside tangent of the valve chamber 13 and extending downward about 0.118°. The ribs 26 prevent the ball 22 from traveling to the uppermost region of the chamber 13 thereby allowing fluid to flow from the chamber 13 to the straw 20 with minimal obstruction.

The lower portion of the valve chamber 13 has a diameter that is only slightly larger than the ball 22. In the preferred embodiment the ball size is 0.250" and the lower portion of the ball chamber is 0.260". This dimensional relationship allows a small amount of fluid to exit the valve chamber 13 prior to the ball 22 reaching the valve seat 24 when suction on the straw 20 by a user is interrupted so that fluid retained in the straw 20 drops down a small amount. It is desirable that the fluid retained in the straw 20 is slightly recessed from the extreme top of the straw when drinking by the user is interrupted because this reduces the amount of splatter that may occur when the drinking vessel 21, as seen in FIG. 3, containing the straw 20 is abruptly placed on a hard surface, such as a table.

Referring now to FIG. 2a, the inlet end valve seat 24 is formed by the inward tapering of a sidewall 28 of the lower part of the valve chamber 13. The correct amount of inward taper is essential to the proper operation of the apparatus 10 as tapering off the vertical at an angle of 20.76° or greater may cause the valve 12 to leak back, whereas a taper with an angle of 14.76° degrees or less may cause the ball 22 to stick in the valve seat 24. The preferred embodiment utilizes the sidewall 28 that tapers inwardly at an angle of 17.76°. The valve seat 24 is located far enough from the inlet end 14 that the ball 22 cannot reach an elevation equal to the lower most portion of the apparatus 10. This dimensioning ensures that the ball 22 will not dislodge and the prime in the straw 20 will not be lost which would cause fluid to be released back into the drinking vessel 21.

The type of material from which the ball 22 is manufactured and smoothness of the ball 22 are also important factors in providing for optimum operation. It has been found that balls manufactured from Delrin® provide the best operation and that a Roughness Averaging of 16 or smoother is preferable.

It can thus be seen that the present invention provides an apparatus for retaining fluid in a liquid delivery tube that is of a design that enables it to be injection molded in one piece of resilient material, such as low-density polyethylene so that the valve can be stretchably removed from the core of a mold without sacrificing the dimensional accuracy necessary for proper function. It is to be understood that the terminology that has been used herein is intended to be in the nature of words of description rather than of limitation and the foregoing description of the present invention is solely for illustrative purposes.

Many modifications and variations of the present invention are possible in light of the above teachings. For example, a variety of different dimensions may be utilized for the exterior of the apparatus 10 and the length and taper of the upper portion 15 may be increased or decreased as desired. Therefore, the foregoing description is not to be taken as definitive of the scope of the invention; but rather that which is regarded as the invention is set forth in the following claims.

What is claimed is:

1. An apparatus for retaining fluid in a liquid delivery tube comprising;
    a lower portion having a ball valve that permits only unidirectional flow of fluids and includes a valve chamber for housing a ball and having an inlet end and an outlet end being spaced apart sufficiently so that said ball is longitudinally, reciprocally movable within said chamber from a closed position at the inlet end of said chamber to an open position at the outlet end of said chamber; and
    an upper tubular portion that has an outside diameter that is tapered to its terminus to facilitate insertion into a liquid delivery tube, said tubular portion having an elongated, tapered passageway that communicates with said outlet end of the valve chamber to convey fluid from said chamber to said tube; and
    said valve chamber inlet end includes a valve seat having sidewalls that taper inwardly from said valve chamber such that the diameter of said valve seat is reduced toward the valve chamber inlet end to prevent said ball from becoming stuck therein, and wherein the spacing between said inlet end and said outlet end of said valve chamber is of a sufficient length so that as said ball moves from said open position to said closed position, a portion of the liquid in said delivery tube is permitted to pass back through said apparatus to reduce the amount of liquid in said tube, and wherein said liquid delivery tube is in the form of a straw having an upper end for delivering fluid to the mouth of a user and a bottom end to which said apparatus is attached.

* * * * *